(12) United States Patent
Warren et al.

(10) Patent No.: US 12,388,067 B2
(45) Date of Patent: Aug. 12, 2025

(54) ANODES FOR LITHIUM-BASED ENERGY STORAGE DEVICES

(71) Applicant: Graphenix Development, Inc., Williamsville, NY (US)

(72) Inventors: Alexander J. Warren, Lake View, NY (US); Peter G. Symons, Buffalo, NY (US); John C. Brewer, Rochester, NY (US); Kyle P. Povlock, Fairport, NY (US); Kevin Tanzil, Rochester, NY (US); Robert G. Anstey, Tonawanda, NY (US); Paul D. Garman, Westerville, OH (US)

(73) Assignee: Graphenix Development, Inc., Williamsville, NY (US)

( * ) Notice: Subject to any disclaimer, the term of this patent is extended or adjusted under 35 U.S.C. 154(b) by 625 days.

(21) Appl. No.: 17/725,894

(22) Filed: Apr. 21, 2022

(65) Prior Publication Data
US 2022/0344627 A1 Oct. 27, 2022

Related U.S. Application Data

(60) Provisional application No. 63/179,974, filed on Apr. 26, 2021.

(51) Int. Cl.
*H01M 4/04* (2006.01)
*H01M 4/134* (2010.01)
(Continued)

(52) U.S. Cl.
CPC ....... *H01M 4/0404* (2013.01); *H01M 4/0428* (2013.01); *H01M 4/134* (2013.01);
(Continued)

(58) Field of Classification Search
CPC .. H01M 4/0404; H01M 4/134; H01M 4/0428; H01M 4/366; H01M 4/386; H01M 4/626; H01M 10/0525
See application file for complete search history.

(56) References Cited

U.S. PATENT DOCUMENTS

| | | |
|---|---|---|
| 5,679,230 A | 10/1997 | Fatcheric et al. |
| 6,579,568 B2 | 6/2003 | Fujiwara et al. |

(Continued)

FOREIGN PATENT DOCUMENTS

| | | |
|---|---|---|
| EP | 3375027 B1 | 3/2019 |
| WO | 2013012334 A1 | 1/2013 |

(Continued)

OTHER PUBLICATIONS

Shane D. Beattie, et al., Understanding capacity fade in silicon based electrodes for lithium-ion batteries using three electrode cells and upper cut-off voltage studies, Journal of Power Sources, vol. 302, 2016, pp. 426-430.

(Continued)

*Primary Examiner* — Karie O'Neill Apicella
(74) *Attorney, Agent, or Firm* — David D. Hsu; Polsinelli LLP

(57) ABSTRACT

An anode for an energy storage device includes a current collector having an electrically conductive layer and a surface layer overlaying the electrically conductive layer. A lithium storage layer may overlay the surface layer. The surface layer may include manganese. The lithium storage layer may include at least 40 atomic % silicon, germanium, or a combination thereof.

20 Claims, 3 Drawing Sheets

(51) Int. Cl.
  *H01M 4/36* (2006.01)
  *H01M 4/38* (2006.01)
  *H01M 4/62* (2006.01)
  *H01M 10/0525* (2010.01)
(52) U.S. Cl.
  CPC .......... *H01M 4/366* (2013.01); *H01M 4/386* (2013.01); *H01M 4/626* (2013.01); *H01M 10/0525* (2013.01)

(56) References Cited

U.S. PATENT DOCUMENTS

| | | |
|---|---|---|
| 6,585,877 B2 | 7/2003 | Mitsuhashi et al. |
| 6,605,369 B1 | 8/2003 | Takahashi et al. |
| 7,378,041 B2 | 5/2008 | Asao et al. |
| 7,767,341 B2 | 8/2010 | Kogetsu et al. |
| 9,293,771 B2 | 3/2016 | Tani et al. |
| 9,376,455 B2 | 6/2016 | Lee et al. |
| 9,603,245 B2 | 3/2017 | Suzuki et al. |
| 10,014,552 B1 | 7/2018 | Shnitser et al. |
| 10,686,214 B2 | 6/2020 | Liu et al. |
| 2005/0031958 A1 | 2/2005 | Fukuoka et al. |
| 2006/0216604 A1 | 9/2006 | Kawase et al. |
| 2009/0181303 A1* | 7/2009 | Neudecker ............ H01M 4/382 252/500 |
| 2010/0040951 A1 | 2/2010 | Yamamoto et al. |
| 2010/0216026 A1 | 8/2010 | Lopatin et al. |
| 2010/0285358 A1 | 11/2010 | Cui et al. |
| 2011/0111304 A1 | 5/2011 | Cui et al. |
| 2011/0266654 A1 | 11/2011 | Kuriki et al. |
| 2012/0121983 A1 | 5/2012 | Yoon et al. |
| 2013/0071755 A1 | 3/2013 | Oguro |
| 2013/0302635 A1 | 11/2013 | Obata et al. |
| 2013/0306486 A1 | 11/2013 | Maeda et al. |
| 2014/0011088 A1 | 1/2014 | Lopatin et al. |
| 2014/0127569 A1 | 5/2014 | Maeda et al. |
| 2015/0072119 A1 | 3/2015 | George et al. |
| 2016/0190564 A1 | 6/2016 | Samarao et al. |
| 2017/0279163 A1 | 9/2017 | Jang et al. |
| 2017/0301616 A1 | 10/2017 | Biederman et al. |
| 2017/0335482 A1 | 11/2017 | Date et al. |
| 2018/0083264 A1 | 3/2018 | Soppe |
| 2019/0044151 A1 | 2/2019 | Elam et al. |
| 2019/0097275 A1 | 3/2019 | Mitlin et al. |
| 2019/0267361 A1 | 8/2019 | Rahim et al. |
| 2019/0267631 A1* | 8/2019 | Brewer ............ H01M 10/0525 |
| 2020/0411851 A1 | 12/2020 | O'Toole et al. |
| 2021/0050584 A1 | 2/2021 | Brewer et al. |
| 2021/0057733 A1 | 2/2021 | Brewer et al. |
| 2021/0057755 A1 | 2/2021 | Brewer et al. |
| 2021/0057757 A1 | 2/2021 | Brewer et al. |
| 2021/0066702 A1 | 3/2021 | O'Toole et al. |

FOREIGN PATENT DOCUMENTS

| | | |
|---|---|---|
| WO | 2015175509 A1 | 11/2015 |
| WO | 2021029769 A1 | 2/2021 |
| WO | 2021241130 A1 | 2/2021 |

OTHER PUBLICATIONS

Cho, et al., Electrochemical Properties of Si Film Electrodes Grown on Current Collectors with CuO Nanostructures for Thin-Film Microbatteries, American Scientific Publishers, 2014, vol. 14, 9300-9306, Journal of Nanoscience and Nanotechnology, all pages.
Corte, Effets du traitement chimique de la surface d'une électrode négative en silicium amorphe pour batterie lithium-ion: etude parspectroscopie infrarouge in situ, Ecole Polytechnique Paris Tech, Oct. 2013, pp. 1-139.
Zhao, et al., A general prelithiation approach for group IV elements and corresponding oxides, Energy Storage Materials (2017), all pages.
Cheng-Yu Wu, et al., Silicon nitride coated silicon thin film on three dimensions current collector for lithium ion battery anode, Journal of Power Sources, vol. 325, 2016, pp. 64-70.
Gomez-Baquero, Silicon Anodes to Enable Better Lithium Ion Batteries, Research Gate, Apr. 2016, all pages, Besstech, LLC.
Enrique Quiroga-González, et al., Optimal Conditions for Fast Charging and Long Cycling Stability of Silicon Microwire Anodes for Lithium ion Batteries, and Comparison with the Performance of Other Si Anode Concepts, Energies, vol. 6, 2013, pp. 5145-5156.
Markus Piwko, et al., Hierarchical columnar silicon anode structures forhigh energy density lithium sulfur batteries, Journal of Power Sources, vol. 351, 2017, pp. 183-191.
Myung-Hoon Kim, et al. Electrochemical characteristics of Si/Mo multilayer anode for Li ion batteries, Revista Mexicana De Fisica S53, 2007, pp. 17-20.
Lin, et al., Optical characterization of Hydrogenated Amorphous Silicon Thin Films Deposited at High Rate, Journal of Electronic Materials, vol. 28, No. 12, 1999, pp. 1452-1456.
Sakabe, et al., Porous amorphous silicon film anodes for high-capacity and stable all-solid-state lithium batteries, Communications Chemistry, (2018)1:24, all pages.
Yasuhiro Domi, et al., Effect of Mechanical Pre-Lithiation on Electrochemical Performance of Silicon Negative Electrode for Lithium-Ion Batteries Journal of the Electrochemical Society 2017 164: pp. A1651-A1654.
Salah, et al., Pure silicon thin-film anodes for lithium ion batteries: A review, Journal of Power Sources, vol. 414, 2019, pp. 48-67.
Soppe, et al., Self-Organized Nano-Structured Silicon as Anode Material for Li-Ion Batteries, A Meeting of the Materials Research Society, Apr. 2-6, 2018, 1 page, Phoenix, Arizona.
Ionel C. Stefan, et al., A Commercially Scalable Process for Silicon Anode Prelithiation, Amprius Inc, DOE Merit Review, Jun. 6-10, 2016, Project ES250, all pages. https://www.energy.gov/sites/prod/files/2016/06/f32/es250_stefan_2016_o_web.pdf.
Makiko Uehara, et al., Thick vacuum deposited silicon films suitable forthe anode of Li-ion battery, Journal of Power Sources, vol. 146, Issues 1-2, 2005, pp. 441-444.
Ulvestad, et al., Silicon Nitride Coated Silicon Thin Films as Anodes for Li-Ion Batteries, ECS Transactions, 64 (22), (2015), pp. 107-111.
Ulvestad, et al., Silicon nitride as anode material for Li-ion batteries: Understanding the SiNx conversion reaction, Journal of Power Sources, vol. 399, 2018, pp. 414-421.
Florian Holtstiege, et al., Pre-Lithiation Strategies for Rechargeable Energy Storage Technologies: Concepts, Promises and Challenges, Batteries, vol. 4, 2018, pp. 1-39.
Xu, et al., A high-performance Li-ion anode from direct deposition of Sinanoparticles, Nano Energy, vol. 38, 2017, pp. 477-485.
Xu, et al., (Supplemental Info) A high-performance Li-ion anode from direct deposition of Si nanoparticles, Nano Energy, vol. 38, 2017, pp. 1-10.
Xu, et al., Engineering the Direct Deposition of Si Nanoparticles for Improved Performance in Li-Ion Batteries, Journal of The Electrochemical Society, 166(3), 2019, pp. A5252-A5258.
Yang, Jinho, "Development Of Silicon-Based Anodes And In-Situ Characterization Techniques For Lithium Ion Batteries" (2014). Wayne State University Dissertations, Paper 1034, all pages. https://digitalcommons.wayne.edu/oa_dissertations/1034.
Application No. PCT/US2021/039426 , International Search Report and Written Opinion, Mailed On Oct. 5, 2021, 10 pages.

* cited by examiner

ANODES FOR LITHIUM-BASED ENERGY STORAGE DEVICES

CROSS-REFERENCE TO RELATED APPLICATION

This application claims the benefit of priority to U.S. Provisional Application 63/179,974, filed Apr. 26, 2021, the entire contents of which are incorporated herein by reference for all purposes.

TECHNICAL FIELD

The present disclosure relates to lithium-ion batteries and related energy storage devices.

BACKGROUND

Silicon has been proposed for lithium-ion batteries to replace the conventional carbon-based anodes, which have a storage capacity that is limited to ~370 mAh/g. Silicon readily alloys with lithium and has a much higher theoretical storage capacity (~3600 to 4200 mAh/g at room temperature) than carbon anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles, and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into various approaches, batteries based primarily on silicon have yet to make a large market impact due to unresolved problems.

SUMMARY

There remains a desire for anodes for lithium-based energy storage devices such as Li-ion batteries that are easy to manufacture, robust to handling, high in charge capacity amenable to fast charging, for example, at least 1 C, and that have acceptable cycle life.

In accordance with an embodiment of this disclosure, an anode for an energy storage device includes a current collector having an electrically conductive layer and a surface layer overlaying the electrically conductive layer. A lithium storage layer may overlay the surface layer. The surface layer may include manganese. The lithium storage layer may include at least 40 atomic % silicon, germanium, or a combination thereof.

The present disclosure provides anodes for energy storage devices that may have one or more of at least the following advantages relative to conventional anodes: improved stability at aggressive ≥1 C charging rates; higher overall areal charge capacity; higher charge capacity per gram of lithium storage material (e.g., silicon); improved physical durability; simplified manufacturing process; more reproducible manufacturing process; or reduced dimensional changes during operation.

DETAILED DESCRIPTION

It is to be understood that the drawings are for purposes of illustrating the concepts of the disclosure and may not be to scale. Terms like "overlaying", "over" or the like do not necessarily mean direct contact unless such direct contact is noted or clearly required for functionality.

Figure 1:
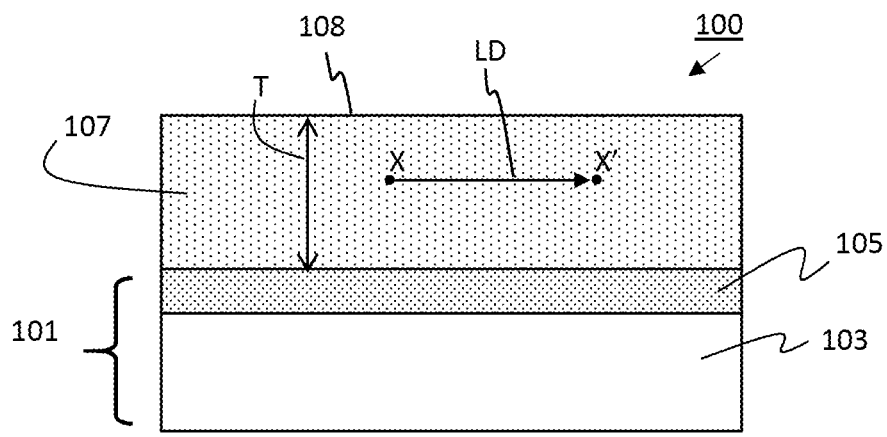
FIG. 1 is a cross-sectional view of a non-limiting example of an anode according to some embodiments.

FIG. 1 is a cross-sectional view of an anode according to some embodiments of the present disclosure. Anode 100 includes current collector 101 and a continuous porous lithium storage layer 107 overlaying the current collector. Current collector 101 includes a surface layer 105 provided over an electrically conductive layer 103, for example an electrically conductive metal layer. The continuous porous lithium storage layer 107 is provided over surface layer 105. In some embodiments, the top of the continuous porous lithium storage layer 107 corresponds to a top surface 108 of anode 100. In some embodiments the continuous porous lithium storage layer 107 is in physical contact with the surface layer 105. In some embodiments the continuous porous lithium storage layer includes a material capable of forming an electrochemically reversible alloy with lithium. In some embodiments, the continuous porous lithium storage layer includes silicon, germanium, tin, or alloys thereof. In some embodiments the continuous porous lithium storage layer comprises at least 40 atomic % silicon, germanium, or a combination thereof. In some embodiments, the continuous porous lithium storage layer is provided by a chemical vapor deposition (CVD) process including, but not limited to, hot-wire CVD or a plasma-enhanced chemical vapor deposition (PECVD).

Figure 2:
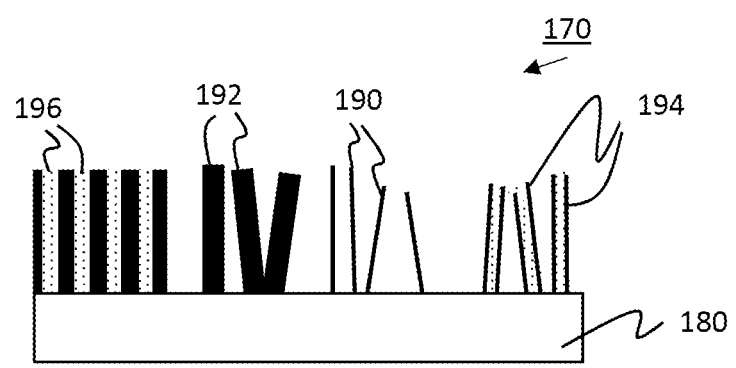
FIG. 2 is a cross-sectional view of a prior art anode.

In the present disclosure, the continuous porous lithium storage layer is substantially free of high aspect ratio nanostructures, e.g., in the form of spaced-apart wires, pillars, tubes or the like, or in the form of regular, linear vertical channels extending through the lithium storage layer. FIG. 2 shows a cross-sectional view of a prior art anode 170 that includes some non-limiting examples of nanostructures, such as nanowires 190, nanopillars 192, nanotubes 194 and nanochannels 196 provided over a current collector 180. The term "nanostructure" herein generally refers to an active material structure (for example, a structure of silicon, germanium or their alloys) having at least one cross-sectional dimension that is less than about 2,000 nm, other than a dimension approximately normal to an underlying substrate (such as a layer thickness) and excluding dimensions caused by random pores and channels. Similarly, the terms "nanowires", "nanopillars" and "nanotubes" refers to wires, pillars and tubes, respectively, at least a portion of which, have a diameter of less than 2,000 nm. "High aspect ratio" nanostructures have an aspect ratio greater than 4:1, where the aspect ratio is generally the height or length of a feature (which may be measured along a feature axis aligned at an angle of 45 to 90 degrees relative to the underlying current collector surface) divided by the width of the feature (which may be measured generally orthogonal to the feature axis). In some embodiments, the continuous porous lithium storage layer is considered "substantially free" of nanostructures when the anode has an average of fewer than 10 nanostructures per 1600 square micrometers (in which the number of nanostructures is the sum of the number of nanowires, nanopillars, and nanotubes in the same unit area), such nanostructures having an aspect ratio of 4:1 or higher. Alternatively, there is an average of fewer than 1 such nanostructures per 1600 square micrometers. As noted below, the current collector may have a high surface roughness or the surface layer may include nanostructures, but these features are separate from the continuous porous lithium storage layer.

In some embodiments, deposition conditions are selected in combination with the current collector so that the continuous porous lithium storage layer is relatively smooth providing an anode with diffuse or total reflectance of at least 10% at 550 nm, alternatively at least 20% (measured at the continuous porous lithium storage layer side). In some embodiments, anodes having such diffuse or total reflectance may be less prone to damage from physical handling. In some embodiments, anodes that are not substantially free of nanostructure may have lower reflectance and may be more prone to damage from physical handling.

Figure 3:
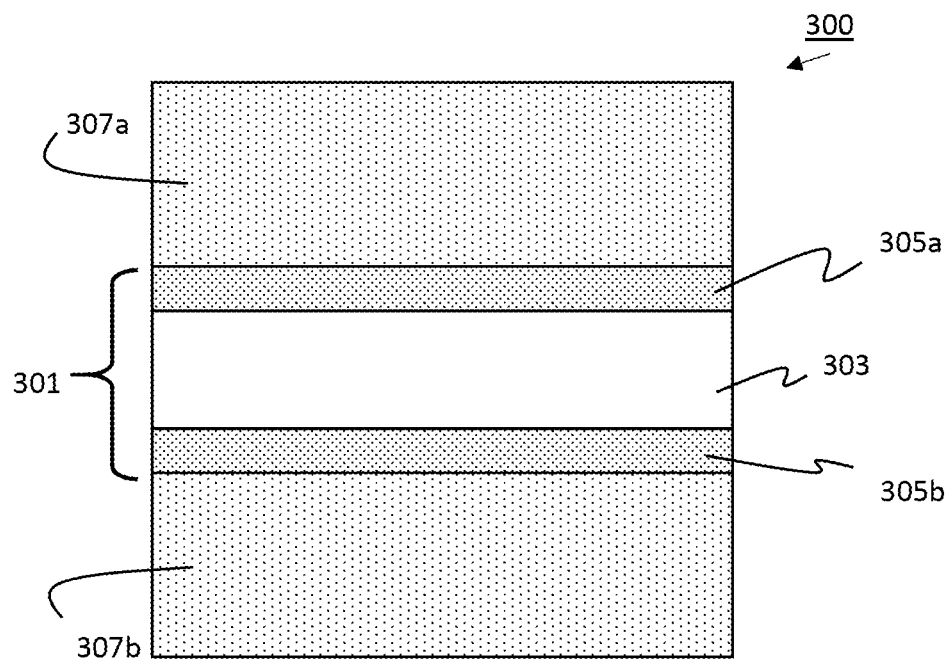
FIG. 3 is a cross-sectional view of a non-limiting example of an anode according to some embodiments.

Anodes of the present disclosure may optionally be two-sided. For example, FIG. 3 is a cross-sectional view of a two-sided anode according to some embodiments. The current collector 301 may include electrically conductive layer 303 and surface layers (305a, 305b) provided on either side of the electrically conductive layer 303. Continuous porous lithium storage layers (307a, 307b) are disposed on both sides to form anode 300. Surface layers 305a and 305b may be the same or different with respect to composition, thickness, roughness or some other property. Similarly, continuous porous lithium storage layers 307a and 307b may be the same or different with respect to composition, thickness, porosity or some other property.

Current Collector

In some embodiments, the current collector or the electrically conductive layer may be characterized by a tensile strength Rm or a yield strength Re. In some cases, the tensile and yield strength properties of the current collector are dependent primarily on the electrically conductive layer, which in some embodiments, may be thicker than the surface layer. If the tensile strength is too high or too low, it may be difficult to handle in manufacturing such as in roll-to-roll processes. During electrochemical cycling of the anode, deformation of the anode may occur if the tensile strength is too low, or alternatively, adhesion of the continuous porous lithium storage layer may be compromised if the tensile strength is too high.

Deformation of the anode is not necessarily a problem for all products, and such deformation may sometimes only occur at higher capacities, i.e., higher loadings of lithium storage layer material. For such products, the current collector or electrically conductive layer may be characterized by a tensile strength Rm in a range of 100-150 MPa, alternatively 150-200 MPa, alternatively 200-250 MPa, alternatively 250-300 MPa, alternatively 300-350 MPa, alternatively 350-400 MPa, alternatively 400-500 MPa, alternatively 500-600 MPa, alternatively 600-700 MPa, alternatively 700-800 MPa, alternatively 800-900 MPa, alternatively 900-1000 MPa, alternatively 1000-1200 MPa, alternatively 1200-1500 MPa, or any combination of ranges thereof.

In some embodiments, significant anode deformation should be avoided, but low battery capacities may not be acceptable. For example, when the anode includes 7 μm or more of amorphous silicon and/or the electrochemical cycling capacity is 1.5 mAh/cm$^2$ or greater, the current collector or electrically conductive layer may be characterized by a tensile strength Rm of greater than 600 MPa. In such embodiments, the tensile strength may be in a range of 601-650 MPa, alternatively 650-700 MPa, alternatively 700-750 MPa, alternatively 750-800 MPa, alternatively 800-850 MPa, alternatively 850-900 MPa, alternatively 900-950 MPa, alternatively 950-1000 MPa, alternatively 1000-1200 MPa, alternatively 1200-1500 MPa, or any combination of ranges thereof. In some embodiments, the current collector or electrically conductive layer may have a tensile strength of greater than 1500 MPa. In some embodiments, the current collector or electrically conductive layer is in the form of a foil having a tensile strength of greater than 600 MPa and an average thickness in a range of 4-8 μm, alternatively 8-10 μm, alternatively 10-15 μm, alternatively 10-15 μm, alternatively 15-20 μm, alternatively 20-25 μm, alternatively 25-30 μm, alternatively 30-40 μm, alternatively 40-50 μm, or any combination of ranges thereof.

In some embodiments the electrically conductive layer may have a conductivity of at least $10^3$ S/m, or alternatively at least $10^6$ S/m, or alternatively at least $10^7$ S/m, and may include inorganic or organic conductive materials or a combination thereof. For anodes having low capacity and/or where there are no concerns regarding anode deformation during use, a wide variety of conductive materials may be used as the electrically conductive layer. In some embodiments, the electrically conductive layer includes a metallic material, e.g., titanium (and its alloys), nickel (and its alloys), copper (and its alloys), or stainless steel. In some embodiments, the electrically conductive layer includes an electrically conductive carbon, such as carbon black, carbon nanotubes, graphene, graphene oxide, reduced graphene oxide, and graphite. In some embodiments the electrically conductive layer may be in the form of a foil, a mesh, or sheet of conductive material. Herein, a "mesh" includes any electrically conductive structure having openings such as found in interwoven wires, foam structures, foils with an array of holes, or the like. In some embodiments, the electrically conductive layer may include multiple layers of different electrically conductive materials. The electrically conductive layer may be in the form of a layer deposited onto an insulating substrate (e.g., a polymer sheet or ceramic substrate coated with a conductive material, including but not limited to, nickel or copper, optionally on both sides). In some embodiments, the electrically conductive layer includes a mesh or sheet of electrically conductive carbon, including but not limited to, those formed from bundled carbon nanotubes or nanofibers.

When higher tensile strength is desirable, the electrically conductive layer may include nickel (and certain alloys), or certain copper alloys, such as, brass (an alloy primarily of copper and zinc), bronze (an alloy primarily of copper and tin), CuMgAgP (an alloy primarily of copper, magnesium, silver and phosphorous), CuFe2P (an alloy primarily of copper, iron and phosphorous) CuNi3 Si (an alloy primarily of copper, nickel and silicon). In some embodiments these nickel- or copper-based higher tensile electrically conductive layers may include roll-formed nickel or copper alloy foils.

Alternatively, a mesh or sheet of electrically conductive carbon, including but not limited to, those formed from bundled carbon nanotubes or nanofibers, may provide higher tensile strength electrically conductive layers. In some embodiments, an electrically conductive metal interlayer may be interposed between the electrically conductive carbon and the surface layer.

Figure 4:
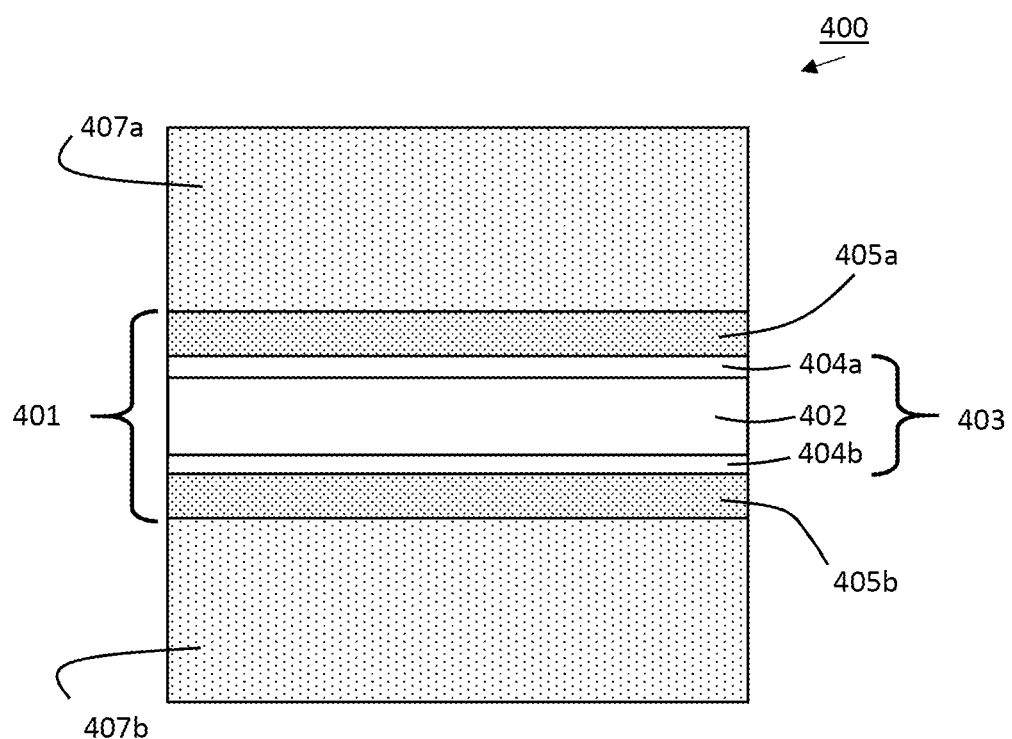
FIG. 4 is a cross-sectional view of a non-limiting example of an anode according to some embodiments.

In some embodiments, any of the above-mentioned electrically conductive layers (low or high tensile strength) may act as a primary electrically conductive layer and further include an electrically conductive interlayer, e.g., a metal interlayer, disposed between the primary electrically conductive layer and the surface layer. FIG. 4 is a cross-sectional view of such an anode according to some embodiments, in this case, for a two-sided anode. The current collector 401 may include electrically conductive layer 403 and surface layers (405a, 405b) provided on either side of the electrically conductive layer 403. Continuous porous lithium storage layers (407a, 407b) are disposed on both sides to form anode 400. Electrically conductive layer 403 includes a primary electrically conductive layer 402 with metal interlayers (404a, 404b) provided on either side. Metal interlayers 404a and 404b may be the same or different with respect to composition, thickness, roughness, or some other property. Similarly, surface layers 405a and 405b may be the same or different with respect to composition, thickness, roughness or some other property. Similarly, continuous porous lithium storage layers 407a and 407b may be the same or different with respect to composition, thickness, porosity or some other property.

The metal interlayer may be applied by, e.g., by sputtering, vapor deposition, electrolytic plating or electroless plating, or any convenient method. The metal interlayer generally has an average thickness of less than 50% of the average thickness of the total electrically conductive layer (i.e., the combined thickness of primary electrically conductive layer and metal interlayer). In some embodiments, the surface layer may form more uniformly over, or adhere better to, the metal interlayer than to the primary electrically conductive layer.

In some embodiments, the current collector may be characterized as having a surface roughness. In some embodiments, the top surface 108 of the lithium storage layer 107 may have a lower surface roughness than the surface roughness of current collector 101. Herein, surface roughness comparisons and measurements may be made using the Roughness Average ($R_a$), RMS Roughness ($R_q$), Maximum Profile Peak Height roughness ($R_p$), Average Maximum Height of the Profile ($R_z$), or Peak Density ($P_c$). In some embodiments, the current collector may be characterized as having both a surface roughness $R_z \geq 2.5$ μm and a surface roughness $R_a \geq 0.25$ μm. In some embodiments, $R_z$ is in a range of 2.5-3.0 μm, alternatively 3.0-3.5 μm, alternatively 3.5-4.0 μm, alternatively 4.0-4.5 μm, alternatively 4.5-5.0 μm, alternatively 5.0-5.5 μm, alternatively 5.5-6.0 μm, alternatively 6.0-6.5 μm, alternatively 6.5-7.0 μm, alternatively 7.0-8.0 μm, alternatively 8.0-9.0 μm, alternatively 9.0 to 10 μm, 10 to 12 μm, 12 to 14 μm or any combination of ranges thereof. In some embodiments, $R_a$ is in a range of 0.25-0.30 μm, alternatively 0.30-0.35 μm, alternatively 0.35-0.40 μm, alternatively 0.40-0.45 μm, alternatively 0.45-0.50 μm, alternatively 0.50-0.55 μm, alternatively 0.55-0.60 μm, alternatively 0.60-0.65 μm, alternatively 0.65-0.70 μm, alternatively 0.70-0.80 μm, alternatively 0.80-0.90 μm, alternatively 0.90-1.0 μm, alternatively 1.0-1.2 μm, alternatively 1.2-1.4 μm, or any combination of ranges thereof.

In some embodiments, some or most of the surface roughness of the current collector may be imparted by the electrically conductive layer. Alternatively, some or most of the surface roughness of the current collector may be imparted by the surface layer. Alternatively, both the electrically conductive layer and the surface layer may contribute substantially to the surface roughness.

In some embodiments, the electrically conductive layer, e.g., the metal interlayer, may include electrodeposited copper nodules to increase surface roughness. For instance, a relatively smooth copper foil may be provided into a first acid copper plating solution having 50 to 250 g/L of sulfuric acid and less than 10 g/L copper provided as copper sulfate. Copper particles may be deposited at room temperature by cathodic polarization of the copper foil and applying a current density of about 0.05 to 0.3 A/cm$^2$ for a few seconds to a few minutes. In some embodiment, the copper foil may next be provided into a second acid copper plating solution having 50 to 200 g/L of sulfuric acid and greater than 50 g/L copper provided as copper sulfate. The second acid copper bath may optionally be warmed to temperature of about 30° C. to 50° C. A thin copper layer may be electroplated at over the copper particles to secure the particles to the copper foil by cathodic polarization and applying a current density of about 0.05 to 0.2 A/cm$^2$ for a few seconds to a few minutes.

Alternatively, or in combination with the electrodeposited copper nodules, the electrically conductive layer may undergo another electrochemical, chemical or physical treatment to impart a desired surface roughness prior to formation of the surface layer.

In some embodiments, a metal foil, including but not limited to, a rolled copper foil, may be first heated in an oven in air (e.g., between 100° and 200 ° C.) for a period of time (e.g., from 10 minutes to 24 hours) remove any volatile materials on its surface and cause some surface oxidation. In some embodiments, the heat-treated foil may then be subjected to additional chemical treatments, e.g., immersion in an acid or in a hydrogen peroxide/HCl solution typically followed by deionized water. In some embodiments, there is no heating, but a chemical treatment or oxidation to modify surface roughness, e.g., treatment with methanesulfonic acid, ammonium persulfate or the like, typically followed by deionized water.

Surface Layer

Figure 5:
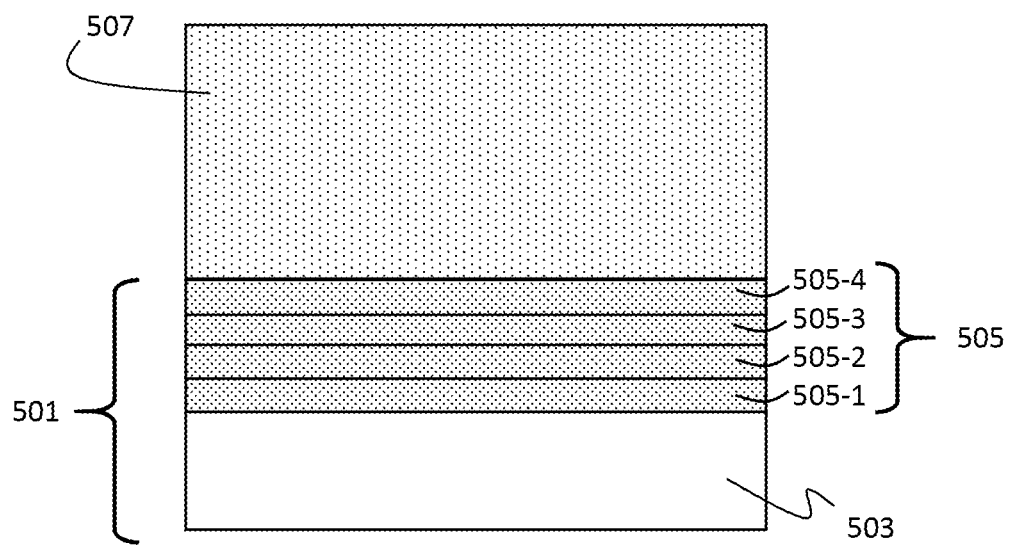
FIG. 5 is a cross-sectional view of a non-limiting example of an anode according to some embodiments.

In some embodiments, the surface layer may include zinc, manganese, a transition metallate, or a silicon compound, or a combination thereof. The surface layer may optionally include additional materials. In some embodiments, the surface layer includes two or more sublayers. In some embodiments, at least one sublayer includes zinc, manganese, a transition metallate, or a silicon compound. Another sublayer may also include any of these materials, or alternatively, may include a metal oxide. A non-limiting example is shown in FIG. 5 illustrating surface layer 505 having up to four surface sublayers. Surface sublayer 505-1 overlays the electrically conductive layer 503. Surface sublayer 505-2 overlays surface sublayer 505-1, surface sublayer 505-3 overlays surface sublayer 505-2, and surface sublayer 505-4 overlays surface sublayer 505-3. Continuous porous lithium storage layer 507 is provided over the uppermost surface sublayer, i.e., the sublayer furthest from the electrically conductive layer 503, which in FIG. 5 may be sublayer 505-4 if all four sublayers are present.

In some embodiments, the surface layer or a sublayer may include zinc or manganese ("surface material A"). In some embodiments, the surface layer or a sublayer may include a transition metallate ("surface material B"). In some embodiments, the surface layer or a sublayer may include a silicon compound including or derived from a siloxane, a silane, a silazane, or a reaction product thereof ("surface material C"). Herein, a "silicon compound" does not include simple elemental silicon such as amorphous silicon. In some embodiments, a sublayer may include a metal oxide or a metal chalcogenide ("surface material D"). These materials are described in more detail below. Using FIG. 5 to help illustrate, Table 1 provides some non-limiting examples of surface layers wherein the surface materials are listed as A, B, C, and/or D, and in which sublayer. It will be appreciated that surface "sublayer" 505-1 for surface layer example nos. 1-3 may correspond to a single surface layer having the material listed.

TABLE 1

| Surface layer example no. | Surface | | Material | |
|---|---|---|---|---|
| | Sublayer 505-1 | Sublayer 505-2 | Sublayer 505-3 | Sublayer 505-4 |
| 1 | A | | | |
| 2 | B | | | |
| 3 | C | | | |
| 4 | A | B | | |
| 5 | A | C | | |
| 6 | A | D | | |
| 7 | A | B | C | |
| 8 | A | B | C | D |
| 9 | A | B | D | |
| 10 | A | B | D | C |
| 11 | A | C | D | |
| 12 | A | D | C | |
| 13 | B | C | | |
| 14 | B | C | D | |
| 15 | B | D | | |
| 16 | B | D | C | |
| 17 | C | D | | |
| 18 | D | C | | |

Zinc or Manganese (Surface Material A)

In some embodiments, the surface layer or sublayer includes metallic zinc or a zinc alloy, which may be deposited, for example, by electrolytic plating, electroless plating, physical vapor deposition, chemical vapor deposition or sputtering. Representative electrolytic plating solutions include those based on zinc pyrophosphate, zinc chloride, zinc cyanide or zinc sulfate plating. For example, a zinc pyrophosphate plating solution may be used having zinc concentration of 5 g/l to 30 g/l, a potassium pyrophosphate concentration of 50 g/l to 500 g/l, and pH 9 to pH 12. Plating may be carried out at a solution temperature of 20° C. to 50° C. by cathodic polarization of the electrically conductive layer under current density of 0.003 A/cm$^2$ to 0.10 A/cm$^2$ for a few seconds to a few minutes. In some embodiments, the zinc plating solution may further include a manganese, stannous or nickel salt to form a zinc-manganese alloy, a zinc-tin alloy, or a zinc-nickel alloy. In some embodiments, a zinc-nickel alloy may include at 5-10 atomic % nickel, alternatively 10-15 atomic % nickel, alternatively 15-20 atomic % nickel, alternatively 20-30 atomic % nickel, alternatively 30-45 atomic % nickel. Numerous other plating compositions and conditions are available and may be used instead.

In some embodiments, the amount of manganese in the surface layer or sublayer may be at least 0.5 mg/m$^2$, alternatively at least 1 mg/m$^2$, alternatively at least 2 mg/m$^2$, alternatively at least 5 mg/m$^2$. In some embodiments, the amount of manganese is less than 1000 mg/m$^2$. In some embodiments, the amount of manganese may be in a range of 1-2 mg/m$^2$, alternatively 2-5 mg/m$^2$, alternatively 5-10 mg/m$^2$, alternatively 10-20 mg/m$^2$, alternatively 20-50 mg/m$^2$, alternatively 50-75 mg/m$^2$, alternatively 75-100 mg/m$^2$, alternatively 100-250 mg/m$^2$, alternatively 250-500 mg/m$^2$, alternatively 500-1000 mg/m$^2$, alternatively 1000-2000 mg/m$^2$, alternatively 2000-3000 mg/m$^2$, alternatively 3000-4000 mg/m$^2$, alternatively 4000-5000 mg/m$^2$, or any combination of ranges thereof. In some embodiments, a surface layer or sublayer having a manganese-containing material may be at least 0.2 nm thick, alternatively at least 0.5 nm thick, alternatively at least 1 nm thick, at least 2 nm thick. In some embodiments a surface layer or sublayer having a manganese-containing material has a thickness in a range of 0.2-0.5 nm, alternatively 0.5-1.0 nm, alternatively 1.0-2.0 nm, alternatively 2.0-5.0 nm, alternatively 5.0-10 nm, alternatively 10-20 nm, alternatively 20-50 nm, alternatively 50-100 nm, alternatively 100-200 nm, alternatively 200-300 nm, alternatively 300-400 nm, alternatively 400-500 nm, 500-700 nm, or any combination of ranges thereof. In some embodiments, at least a portion of a surface layer or sublayer includes manganese in a zero valent or a divalent state.

In some embodiments, the amount of zinc in the surface layer or sublayer may be at least 0.5 mg/m$^2$, alternatively at least 1 mg/m$^2$, alternatively at least 2 mg/m$^2$, alternatively at least 5 mg/m$^2$. In some embodiments, the amount of zinc is less than 1000 mg/m$^2$. In some embodiments, the amount of zinc may be in a range of 1-2 mg/m$^2$, alternatively 2-5 mg/m$^2$, alternatively 5-10 mg/m$^2$, alternatively 10-20 mg/m$^2$, alternatively 20-50 mg/m$^2$, alternatively 50-75 mg/m$^2$, alternatively 75-100 mg/m$^2$, alternatively 100-250 mg/m$^2$, alternatively 250-500 mg/m$^2$, alternatively 500-1000 mg/m$^2$, alternatively 1000-2000 mg/m$^2$, alternatively 2000-3000 mg/m$^2$, alternatively 3000-4000 mg/m$^2$, alternatively 4000-5000 mg/m$^2$, or any combination of ranges thereof. In some embodiments, a surface layer or sublayer having a zinc-containing material may be at least 0.2 nm thick, alternatively at least 0.5 nm thick, alternatively at least 1 nm thick, at least 2 nm thick. In some embodiments a surface layer or sublayer having a zinc-containing material has a thickness in a range of 0.2-0.5 nm, alternatively 0.5-1.0 nm, alternatively 1.0-2.0 nm, alternatively 2.0-5.0 nm, alternatively 5.0-10 nm, alternatively 10-20 nm, alternatively 20-50 nm, alternatively 50-100 nm, alternatively 100-200 nm, alternatively 200-300 nm, alternatively 300-400 nm, alternatively 400-500 nm, 500-700 nm, or any combination of ranges thereof. In some embodiments, at least a portion of a surface layer or sublayer includes zinc in a zero valent or a divalent state.

Transition Metallate (Surface Material B)

In some embodiments, the surface layer (or surface sublayer) includes a transition metallate transition metallate such as an oxometallate, a sulfometallate, a cyanometallate, or a mixture thereof. Note that oxometallates may be considered a subset of metal oxides where the metal oxide is anionic in nature and is associated with a cation, which may optionally be an alkali metal, an alkaline earth metal, or another transition metal. In some embodiments, the transition metallate includes titanium, vanadium, chromium, manganese, iron, cobalt, nickel, molybdenum, tungsten, zirconium, or niobium. In some embodiments, the transition metallate is a chromate, tungstate, or molybdate. Transition metallates may be coated from a solution, electrolytically plated, or electrolessly plated (which may include "immersion plating").

A non-limiting, representative electrolytic chromate solution may have a chromic acid or potassium chromate concentration of 2 g/l to 7 g/l, and pH of 10 to 12. The solution may optionally be warmed to a temperature of 30° C. to 40° C. and a cathodic current density of 0.02 to 8 A/cm² applied to the electrically conductive layer, typically for a few seconds, to deposit the chromate. In some embodiments, such a surface layer or surface sublayer may be referred to as a chromate-treatment layer. The deposited chromate may include a hydroxide, an oxide or an oxide/hydroxide mixture of chromium (III) and/or chromium (VI).

In some embodiments, the amount of chromium in the surface layer or sublayer may be at least 0.3 mg/m², alternatively at least 0.5 mg/m², alternatively at least 1 mg/m², alternatively at least 2 mg/m². In some embodiments, the amount of chromium is less than 250 mg/m². In some embodiments, the amount of chromium may be in a range of 0.5-1 mg/cm², alternatively 1-2 mg/m², alternatively 2-5 mg/m², alternatively 5-10 mg/m², alternatively 10-20 mg/m², alternatively 20-50 mg/m², alternatively 50-75 mg/m², alternatively 75-100 mg/m², alternatively 100-250 mg/m², or any combination of ranges thereof. In some embodiments, a surface layer or sublayer having a chromium-containing material may be at least 0.2 nm thick, alternatively at least 0.5 nm thick, alternatively at least 1 nm thick, at least 2 nm thick. In some embodiments a surface layer or sublayer having a chromium-containing material has a thickness in a range of 0.2-0.5 nm, alternatively 0.5-1.0 nm, alternatively 1.0-2.0 nm, alternatively 2.0-5.0 nm, alternatively 5.0-10 nm, alternatively 10-20 nm, alternatively 20-50 nm, alternatively 50-100 nm, or any combination of ranges thereof.

Silicon Compounds (Surface Material C)

In some embodiments, a surface layer or sublayer includes a silicon compound formed by treatment with a silane, a siloxane, or a silazane compound, any of which may be referred to herein as a silicon compound agent. In some embodiments, the silicon compound agent treatment may increase adhesion to an overlying sublayer or to the continuous porous lithium storage layer. In some embodiments, the silicon compound may be a polymer including, but not limited to, a polysiloxane. A silicon compound agent may be provided in a solution, e.g., at about 0.3 g/l to 15 g/l in water or an organic solvent. Adsorption methods of a silicon compound agent include an immersion method, a showering method and a spraying method and are not especially limited. In some embodiments a silicon compound agent may be provided as a vapor and adsorbed onto an underlying sublayer. In some embodiments, a silicon compound agent may deposited by initiated chemical vapor deposition (iCVD). In some embodiments, a silicon compound agent may include an olefin-functional silane moiety, an epoxy-functional silane moiety, an acryl-functional silane moiety, an amino-functional silane moiety, or a mercapto-functional silane moiety, optionally in combination with siloxane or silazane groups. In some embodiments, the silicon compound agent may be a siloxysilane. In some embodiments, a silicon compound agent may undergo polymerization during deposition or after deposition. Some non-limiting examples of silicon compound agents include hexamethyldisilazane (HMDS), vinyltrimethoxysilane, vinylphenyltrimethoxysilane, 3-methacryloxypropyltrimethoxysilane, 3-glycidoxypropyltrimethoxysilane, 3-glycidoxypropyltriethoxysilane, 4-glycidylbutyltrimethoxysilane, 3-aminopropyltriethoxysilane, N-2-(aminoethyl)-3-aminopropyltrimethoxysilane, N-3-(4-(3-aminopropoxy)butoxy)propyl-3-aminopropyltrimethoxysilane, imidazolesilane, triazinesilane, 3-mercaptopropyltrimethoxysilane, 1,3,5,7-tetravinyl-1,3,5,7-tetramethylcyclotetrasiloxane, 1,3,5-trivinyl-1,3,5-trimethylcyclotrisiloxane, pentavinylpentamethylcyclopentasiloxane, and octavinyl-T8-silesquioxane. In some embodiments, a layer or sublayer including a silicon compound may include silicon, oxygen, and carbon, and may further include nitrogen or sulfur.

In some embodiments, treatment with a silicon compound agent may be followed by a step to drive off solvent or to initiate polymerization or another chemical transformation, wherein the step may involve heating, contact with a reactive reagent, or both. A surface sublayer formed from a silicon compound agent should not be so thick as to create a significant barrier to charge conduction between the current collector and the continuous porous lithium storage layer. In some embodiments, a sublayer formed from a silicon compound agent has a silicon content in a range of 0.1 to 0.2 mg/m², alternatively in a range of 0.1-0.25 mg/m², alternatively in a range of 0.25-0.5 mg/m², alternatively in a range of 0.5-1 mg/m², alternatively 1-2 mg/m², alternatively 2-5 mg/m², alternatively 5-10 mg/m², alternatively 10-20 mg/m², alternatively 20-50 mg/m², alternatively 50-100 mg/m², alternatively 100-200 mg/m², alternatively 200-300 mg/m², or any combination of ranges thereof. In some embodiments, a surface layer or sublayer formed from a silicon compound agent may include up to one monolayer of the silicon compound agent or its reaction product, alternatively up to 2 monolayers; alternatively up to 4 monolayers, alternatively up to 6 monolayers, alternatively up to 8 monolayers, alternatively up to 10 monolayers, alternatively up to 15 monolayers, alternatively up to 20 monolayers, alternatively up to 50 monolayers, alternatively up to 100 monolayers, alternatively up to 200 monolayers. The surface layer or surface sublayer having the silicon compound may be porous. In some embodiments, the silicon compound may break down or partially breaks down during deposition of the lithium storage layer.

Metal Oxides or Metal Chalcogenides (Surface Material D)

In some embodiments, a surface sublayer may include a metal oxide and such surface sublayers may be referred to as a metal oxide sublayer. In some embodiments, the metal oxide sublayer includes a transition metal oxide. In some embodiments, the metal oxide sublayer includes an oxide of titanium, vanadium, chromium, manganese, iron, cobalt, nickel, copper, zinc, molybdenum, tungsten, silver, zirconium, hafnium, tin, aluminum, indium, or niobium. In some embodiments, the metal oxide sublayer is an electrically conductive doped oxide, including but not limited to, indium-doped tin oxide (ITO) or an aluminum-doped zinc oxide (AZO). In some embodiments, the metal oxide sublayer includes an alkali metal oxide or alkaline earth metal oxide. In some embodiments the metal oxide sublayer includes an oxide of lithium. The metal oxide sublayer may include mixtures of metals. For example, an "oxide of nickel" may optionally include other metals in addition to nickel. In some embodiments, the metal oxide sublayer includes an oxide of an alkali metal (e.g., lithium or sodium) or an alkaline earth metal (e.g., magnesium or calcium) along with an oxide of a transition metal (e.g., titanium, nickel, or copper). In some embodiments, the metal oxide sublayer may include a small amount of hydroxide such that the ratio of oxygen atoms in the form of hydroxide relative to oxide is less than 1 to 4, respectively. The metal oxide sublayer may include a stoichiometric oxide, a non-stoichiometric oxide or both. In some embodiments, the metal within the metal oxide sublayer may exist in multiple oxidation states. Ordinarily, oxometallates may be considered a subclass of metal oxides. For the sake of clarity, any reference herein to "metal oxide" with respect to its use in a surface sublayer excludes oxometallates.

In some embodiments, the metal oxide sublayer has an average thickness of at least 0.1 nm, alternatively at least 0.2 nm. In some embodiments, a metal oxide sublayer has an average thickness of less than 5000 nm, alternatively less than 3000 nm. In some embodiments, the metal oxide sublayer has an average thickness in a range of 0.5-1 nm, alternatively 1-2 nm, alternatively 2-5 nm, alternatively 5 to 10 nm, alternatively 10-20 nm, alternatively 20-50 nm, alternatively 50-100 nm, alternatively 100-200 nm, alternatively 200-500 nm, alternatively 500-1000 nm, alternatively 1000-1500 nm, alternatively 1500-2000 nm, alternatively 2000-2500 nm, alternatively 2500-3000 nm, alternatively 3000-4000 nm, alternatively 4000-5000 nm, or any combination of ranges thereof.

In some embodiments, the metal oxide sublayer is formed by atomic layer deposition (ALD), chemical vapor deposition (CVD), thermal vapor deposition, or sputtering.

In some embodiments, a metal oxide sublayer precursor composition may be coated or printed over a current collector having one or more surface sublayers as described above the and then treated to form metal oxide sublayer. Some non-limiting examples of metal oxide precursor compositions include sol-gels (metal alkoxides), metal carbonates, metal acetates (including organic acetates), metal hydroxides and metal oxide dispersions. The metal oxide precursor composition may be thermally treated to form the metal oxide sublayer.

In some embodiments, the metal oxide sublayer precursor composition includes a metal, e.g., metal-containing particles or a sputtered metal layer. The metal may then be oxidized in the presence of oxygen (e.g., thermally), electrolytically oxidized, chemically oxidized in an oxidizing liquid or gaseous medium or the like to form the metal oxide sublayer.

In some embodiments, a sublayer may include a metal chalcogenide such as a metal sulfide or metal selenide. Metal chalcogenides may be deposited by ALD, CVD, thermal vapor deposition, or sputtering. Alternatively, metal chalcogenides may be deposited by a coating method from a solution or a mixture. In some embodiments, a metal chalcogenide sublayer may be formed by chemically reacting a metal with a metal sulfide forming reactant. In some embodiments, the metal chalcogenide sublayer has an average thickness of at least 0.1 nm, alternatively at least 0.2 nm. In some embodiments, a metal chalcogenide sublayer may have an average thickness of less than 5000 nm, alternatively less than 3000 nm. In some embodiments, the metal oxide sublayer has an average thickness in a range of 0.5-1 nm, alternatively 1-2 nm, alternatively 2-5 nm, alternatively 5 to 10 nm, alternatively 10-20 nm, alternatively 20-50 nm, alternatively 50-100 nm, alternatively 100-200 nm, alternatively 200-500 nm, alternatively 500-1000 nm, alternatively 1000-1500 nm, alternatively 1500-2000 nm, alternatively 2000-2500 nm, alternatively 2500-3000 nm, alternatively 3000-4000 nm, alternatively 4000-5000 nm, or any combination of ranges thereof.

In some embodiments, the ratio of the average thickness of the surface layer (including all sublayers, if present) to the average thickness of the electrically conducting layer is less than 1, alternatively less than 0.5, alternatively less than 0.2, alternatively less than 0.1, alternatively less than 0.05, alternatively less than 0.02.

In some embodiments, prior to depositing the continuous porous lithium storage layer, the current collector may be thermally treated (optionally under inert conditions). Such heating may improve the physical properties of the current collector, e.g., by reducing internal stresses, improving adhesion between various layers and sublayers of the current collector, or both. The temperature and time of the aforementioned thermal treatment step depend largely on choice of materials. In some embodiment, the thermal treatment includes heating to a temperature in a range of 100-200° C., alternatively 200-300° C., alternatively 300-400 ° C., alternatively 400-500° C., or any combination of ranges thereof In some embodiments, the thermal treatment step includes exposure to one of the aforementioned temperature ranges for time in a range of 1-10 minutes, alternatively 10-30 minutes, alternatively 30-60 minutes, alternatively 1-2 hours, alternatively 2-4 hours, alternatively 4-8 hours, alternatively 8-16 hours, alternatively 16-24 hours, or any combination of ranges thereof.

Lithium Storage Layer

In some embodiments, the lithium storage layer may be a continuous porous lithium storage layer that includes a porous material capable of reversibly incorporating lithium. In some embodiments, the continuous porous lithium storage layer includes silicon, germanium, antimony, tin, or a mixture of two or more of these elements. In some embodiments, the continuous porous lithium storage layer is substantially amorphous. In some embodiments, the continuous porous lithium storage layer includes substantially amorphous silicon. Such substantially amorphous storage layers may include a small amount (e.g., less than 20 atomic %) of crystalline material dispersed therein. The continuous porous lithium storage layer may include dopants such as hydrogen, boron, phosphorous, sulfur, fluorine, aluminum, gallium, indium, arsenic, antimony, bismuth, nitrogen, or metallic elements. In some embodiments the continuous porous lithium storage layer may include porous substantially amorphous hydrogenated silicon (a-Si:H), having, e.g., a hydrogen content of from 0.1 to 20 atomic %, or alternatively higher. In some embodiments, the continuous porous lithium storage layer may include methylated amorphous silicon. Note that, unless referring specifically to hydrogen content, any atomic % metric used herein for a lithium storage material or layer refers to atoms other than hydrogen.

In some embodiments, the continuous porous lithium storage layer includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, the continuous porous lithium storage layer includes at least 40 atomic % silicon, alternatively at least 50 atomic %, alternatively at least 60 atomic %, alternatively at least 70 atomic %, alternatively, at least 80 atomic %, alternatively at least 90 atomic %, alternatively at least 95 atomic %, alternatively at least 97 atomic %. Note that in the case of prelithiated anodes as discussed below, the lithium content is excluded from this atomic % characterization.

In some embodiments, the continuous porous lithium storage layer includes less than 10 atomic % carbon, alternatively less than 5 atomic %, alternatively less than 2 atomic %, alternatively less than 1 atomic %, alternatively less than 0.5 atomic %. In some embodiments, the continuous porous lithium storage layer includes less than 1% by weight of carbon-based binders, graphitic carbon, graphene, graphene oxide, reduced graphene oxide, carbon black and conductive carbon.

The continuous porous lithium storage layer may include voids or interstices (pores), which may be random or non-uniform with respect to size, shape, and distribution. Such porosity does not result in, or result from, the formation of any recognizable nanostructures such as nanowires, nanopillars, nanotubes, ordered nanochannels or the like. In some embodiments, the pores may be polydisperse. In some embodiments, the continuous porous lithium storage layer may be characterized as nanoporous. In some embodiments the continuous porous lithium storage layer has an average density in a range of 1.0-1.1 g/cm$^3$, alternatively 1.1-1.2 g/cm$^3$, alternatively 1.2-1.3 g/cm$^3$, alternatively 1.3-1.4 g/cm$^3$, alternatively 1.4-1.5 g/cm$^3$, alternatively 1.5-1.6 g/cm$^3$, alternatively 1.6-1.7 g/cm$^3$, alternatively 1.7-1.8 g/cm$^3$, alternatively 1.8-1.9 g/cm$^3$, alternatively 1.9-2.0 g/cm$^3$, alternatively 2.0-2.1 g/cm$^3$, alternatively 2.1-2.2 g/cm$^3$, alternatively 2.2-2.25 g/cm$^3$, alternatively 2.25-2.29 g/cm$^3$, or any combination of ranges thereof, and includes at least 70 atomic % silicon, 80 atomic % silicon, alternatively at least 85 atomic % silicon, alternatively at least 90 atomic % silicon, alternatively at least 95 atomic % silicon.

In some embodiments, the majority of active material (e.g., silicon, germanium or alloys thereof) of the continuous porous lithium storage layer has substantial lateral connectivity across portions of the current collector creating, such connectivity extending around random pores and interstices. Referring again to FIG. 1, in some embodiments, "substantial lateral connectivity" means that active material at one point X in the continuous porous lithium storage layer 107 may be connected to active material at a second point X' in the layer at a straight-line lateral distance LD that is at least as great as the average thickness T of the continuous porous lithium storage layer, alternatively, a lateral distance at least 2 times as great as the thickness, alternatively, a lateral distance at least 3 times as great as the thickness. Not shown, the total path distance of material connectivity, including circumventing pores and following the topography of the current collector, may be longer than LD. In some embodiments, the continuous porous lithium storage layer may be described as a matrix of interconnected silicon, germanium or alloys thereof, with random pores and interstices embedded therein. In some embodiments, the continuous porous lithium storage layer has a sponge-like form. It should be noted that the continuous porous lithium storage layer does not necessarily extend across the entire anode without any lateral breaks and may include random discontinuities or cracks and still be considered continuous. In some embodiments, such discontinuities may occur more frequently on rough current collector surfaces.

In some embodiments, the continuous porous lithium storage layer includes a substoichiometric oxide of silicon (SiO$_x$), germanium (GeO$_x$) or tin (SnO$_x$) wherein the ratio of oxygen atoms to silicon, germanium or tin atoms is less than 2:1, i.e., x<2, alternatively less than 1:1, i.e., x<1. In some embodiments, x is in a range of 0.02 to 0.95, alternatively 0.02 to 0.10, alternatively 0.10 to 0.50, or alternatively 0.50 to 0.95, alternatively 0.95 to 1.25, alternatively 1.25 to 1.50, or any combination of ranges thereof.

In some embodiments, the continuous porous lithium storage layer includes a substoichiometric nitride of silicon (SiN$_y$), germanium (GeN$_y$) or tin (SnN$_y$) wherein the ratio of nitrogen atoms to silicon, germanium or tin atoms is less than 1.25:1, i.e., y<1.25. In some embodiments, y is in a range of 0.02 to 0.95, alternatively 0.02 to 0.10, alternatively 0.10 to 0.50, or alternatively 0.50 to 0.95, alternatively 0.95 to 1.20, or any combination of ranges thereof. Lithium storage layer having a substoichiometric nitride of silicon may also be referred to as nitrogen-doped silicon or a silicon-nitrogen alloy.

In some embodiments, the continuous porous lithium storage layer includes a substoichiometric oxynitride of silicon (SiO$_x$N$_y$), germanium (GeO$_x$N$_y$), or tin (SnO$_x$N$_y$) wherein the ratio of total oxygen and nitrogen atoms to silicon, germanium or tin atoms is less than 1:1, i.e., (x+y)<1. In some embodiments, (x+y) is in a range of 0.02 to 0.95, alternatively 0.02 to 0.10, alternatively 0.10 to 0.50, or alternatively 0.50 to 0.95, or any combination of ranges thereof.

In some embodiments, the above sub-stoichiometric oxides, nitrides or oxynitrides are provided by a CVD process, including but not limited to, a PECVD process. The oxygen and nitrogen may be provided uniformly within the continuous porous lithium storage layer, or alternatively the oxygen or nitrogen content may be varied as a function of storage layer thickness.

CVD

CVD generally involves flowing a precursor gas, a gasified liquid in terms of direct liquid injection CVD or gases and liquids into a chamber containing one or more objects, typically heated, to be coated. Chemical reactions may occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage layer, the surface layer or sublayer, a supplemental layer (see below) or other layers. It may be done in hot-wall reactors or cold-wall reactors, at sub-torr total pressures to above-atmospheric pressures, with and without carrier gases, and at temperatures typically ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, substrate voltage bias (if applicable), and plasma energy (if applicable).

As mentioned, the continuous porous lithium storage layer, e.g., a layer of silicon or germanium or both, may be provided by plasma-enhanced chemical vapor deposition (PECVD). Relative to conventional CVD, deposition by PECVD can often be done at lower temperatures and higher rates, which can be advantageous for higher manufacturing throughput. In some embodiments, the PECVD is used to deposit a substantially amorphous silicon layer (optionally doped) over the surface layer. In some embodiments, PECVD is used to deposit a substantially amorphous continuous porous silicon layer over the surface layer.

In PECVD processes, according to various implementations, a plasma may be generated in a chamber in which the substrate is disposed or upstream of the chamber and fed into the chamber. Various types of plasmas may be used including, but not limited to, capacitively-coupled plasmas, inductively-coupled plasmas, and conductive coupled plasmas. Any appropriate plasma source may be used, including DC, AC, RF, VHF, combinatorial PECVD and microwave sources may be used. In some embodiments, magnetron assisted RF PECVD may be used PECVD process conditions (temperatures, pressures, precursor gases, carrier gasses, dopant gases, flow rates, energies, and the like) can vary according to the particular process and tool used, as is well known in the art.

In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas(es) used, the silicon layer may be formed by decomposition or reaction with another compound, such as by hydrogen reduction. In some embodiments, the gases may include a silicon source such as silane, a noble gas such as helium, argon, neon, or xenon, optionally one or more dopant gases, and substantially no hydrogen. In some embodiments, the gases may include argon, silane, and hydrogen, and optionally some dopant gases. In some embodiments the gas flow ratio of argon relative to the combined gas flows for silane and hydrogen is at least 3.0, alternatively at least 4.0. In some embodiments, the gas flow ratio of argon relative to the combined gas flows for silane and hydrogen is in a range of 3-5, alternatively 5-10, alternatively 10-15, alternatively 15-20, or any combination of ranges thereof. In some embodiments, the gas flow ratio of hydrogen gas to silane gas is in a range of 0-0.1, alternatively 0.1-0.2, alternatively 0.2-0.5, alternatively 0.5-1, alternatively 1-2, alternatively 2-5, or any combination of ranges thereof. In some embodiments, higher porosity silicon may be formed and/or the rate of silicon deposition may be increased when the gas flow ratio of silane relative to the combined gas flows of silane and hydrogen increases. In some embodiments a dopant gas is borane or phosphine, which may be optionally mixed with a carrier gas. In some embodiments, the gas flow ratio of dopant gas (e.g., borane or phosphine) to silicon source gas (e.g., silane) is in a range of 0.0001-0.0002, alternatively 0.0002-0.0005, alternatively 0.0005-0.001, alternatively 0.001-0.002, alternatively 0.002-0.005, alternatively 0.005-0.01, alternatively 0.01-0.02, alternatively 0.02-0.05, alternatively 0.05-0.10, or any combination of ranges thereof. Such gas flow ratios described above may refer to the relative gas flow, e.g., in standard cubic centimeters per minute (SCCM). In some embodiments, the PECVD deposition conditions and gases may be changed over the course of the deposition.

In some embodiments, the temperature at the current collector during at least a portion of the time of PECVD deposition is in a range of 50° C. to 100° C., alternatively 100° C. to 200° C., alternatively 200° C. to 300° C., alternatively 300° C. to 400° C., alternatively 400° C. to 500° C., alternatively 500° C. to 600° C., or any combination of ranges thereof. In some embodiments, the temperature may vary during the time of PECVD deposition. For example, the temperature during early times of the PECVD may be higher than at later times. Alternatively, the temperature during later times of the PECVD may be higher than at earlier times.

The thickness or mass per unit area of the continuous porous lithium storage layer depends on the storage material, desired charge capacity and other operational and lifetime considerations. Increasing the thickness typically provides more capacity. If the continuous porous lithium storage layer becomes too thick, electrical resistance may increase and the stability may decrease. In some embodiments, the anode may be characterized as having an active silicon areal density of at least $1.0$ $mg/cm^2$, alternatively at least $1.5$ $mg/cm^2$, alternatively at least 3 $mg/cm^2$, alternatively at least 5 $mg/cm^2$. In some embodiments, the lithium storage structure may be characterized as having an active silicon areal density in a range of $1.5$-$2$ $mg/cm^2$, alternatively in a range of 2-3 $mg/cm^2$, alternatively in a range of 3-5 $mg/cm^2$, alternatively in a range of 5-10 $mg/cm^2$, alternatively in a range of 10-15 $mg/cm^2$, alternatively in a range of 15-20 $mg/cm^2$, or any combination of contiguous ranges thereof. "Active silicon" refers to the silicon in electrical communication with the current collector that is available for reversible lithium storage at the beginning of cell cycling, e.g., after anode "electrochemical formation" discussed later. "Areal density" refers to the surface area of the electrically conductive layer over which active silicon is provided. In some embodiments, not all of the silicon content is active silicon, i.e., some may be tied up in the form of non-active silicides or may be electrically isolated from the current collector.

In some embodiments the continuous porous lithium storage has an average thickness of at least 1 μm, alternatively at least 2.5 μm, alternatively at least 6.5 μm. In some embodiments, the continuous porous lithium storage layer has an average thickness in a range of about 0.5 μm to about 50 μm. In some embodiments, the continuous porous lithium storage layer comprises at least 80 atomic % amorphous silicon and/or has a thickness in a range of 1-1.5 μm, alternatively 1.5-2.0 μm, alternatively 2.0-2.5 μm, alternatively 2.5-3.0 μm, alternatively 3.0-3.5 μm, alternatively 3.5-4.0 μm, alternatively 4.0-4.5 μm, alternatively 4.5-5.0 μm, alternatively 5.0-5.5 μm, alternatively 5.5-6.0 μm, alternatively 6.0-6.5 μm, alternatively 6.5-7.0 μm, alternatively 7.0-8.0 μm, alternatively 8.0-9.0 μm, alternatively 9.0-10 μm, alternatively 10-15 μm, alternatively 15-20 μm, alternatively 20-25 μm, alternatively 25-30 μm, alternatively 30-40 μm, alternatively 40-50 μm, or any combination of ranges thereof.

Other Anode Features

The anode may optionally include various additional layers and features. The current collector may include one or more features to ensure that a reliable electrical connection can be made in the energy storage device. In some embodiments, a supplemental layer is provided over the patterned lithium storage structure. In some embodiments, the supplemental layer is a protection layer to enhance lifetime or physical durability. The supplemental layer may be an oxide formed from the lithium storage material itself, e.g., silicon dioxide in the case of silicon, or some other suitable material. A supplemental layer may be deposited, for example, by ALD, CVD, PECVD, evaporation, sputtering, solution coating, ink jet or any method that is compatible with the anode.

In some embodiments, the top surface of the supplemental layer may correspond to a top surface of the anode.

A supplemental layer should be reasonably conductive to lithium ions and permit lithium ions to move into and out of the patterned lithium storage structure during charging and discharging. In some embodiments, the lithium ion conductivity of a supplemental layer is at least $10^{-9}$ S/cm, alternatively at least $10^{-8}$ S/cm, alternatively at least $10^{-7}$ S/cm, alternatively at least $10^{-6}$ S/cm. In some embodiments, the supplemental layer acts as a solid-state electrolyte.

Some non-limiting examples of materials used in a supplemental layer include metal oxides, nitrides, or oxynitrides, e.g., those containing aluminum, titanium, vanadium, zirconium, hafnium, or tin, or mixtures thereof. The metal oxide, metal nitride or metal oxynitride may include other components such as phosphorous or silicon. The supplemental layer may include a lithium-containing material such as lithium phosphorous oxynitride (LIPON), lithium phosphate, lithium aluminum oxide, $(Li,La)_xTi_yO_z$, or $Li_xSi_yAl_2O_3$. In some embodiments, the supplemental layer includes a metal oxide, metal nitride, or metal oxynitride, and has an average thickness of less than about 100 nm, for example, in a range of about 0.1 to about 10 nm, or alternatively in a range of about 0.2 nm to about 5 nm. UPON or other solid-state electrolyte materials having superior lithium transport properties may have a thickness of more than 100 nm, but may alternatively, be in a range of about 1 to about 50 nm.

In some embodiments, the continuous porous lithium storage layer may be at least partially prelithiated prior to a first electrochemical cycle after battery assembly, or alternatively prior to battery assembly. That is, some lithium may be incorporated into the continuous porous lithium storage layer to form a lithiated storage layer even prior to a first battery cycle. In some embodiments, the lithiated storage layer may break into smaller structures, including but not limited to platelets, that remain electrochemically active and continue to reversibly store lithium. Note that "lithiated storage layer" simply means that at least some of the potential storage capacity of the lithium storage layer is filled, but not necessarily all. In some embodiments, the lithiated storage layer may include lithium in a range of 1% to 5% of the theoretical lithium storage capacity of the continuous porous lithium storage layer, alternatively 5% to 10%, alternatively 10% to 15%, alternatively 15% to 20%, alternatively, 20% to 30%, alternatively 30% to 40%, alternatively 40% to 50%, alternatively 50% to 60%, alternatively 60% to 70%, alternatively 70% to 80%, alternatively 80% to 90%, alternatively 90% to 100%, or any combination of ranges thereof. In some embodiments, a surface layer may capture some of the lithium, and one may need to account for such capture to achieve the desired lithium range in the lithiated storage layer.

In some embodiments prelithiation may include depositing lithium metal over the continuous porous lithium storage layer, alternatively between one or more lithium storage sublayers, or both, e.g., by evaporation, e-beam or sputtering. Alternatively, prelithiation may include contacting the anode with a reductive lithium organic compound, e.g., lithium naphthalene, n-butyllithium or the like. In some embodiments, prelithiation may include incorporating lithium by electrochemical reduction of lithium ion in prelithiation solution.

Battery Features

The preceding description relates primarily to the anode/negative electrode of a lithium-ion battery (LIB). The LIB typically includes a cathode/positive electrode, an electrolyte and a separator (if not using a solid-state electrolyte). As is well known, batteries can be formed into multilayer stacks of anodes and cathodes with an intervening separator. Alternatively, anode/cathode stacks can be formed into a so-called jelly-roll. Such structures are provided into an appropriate housing having desired electrical contacts.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium and combinations thereof. Cathode active materials may operate, e.g., by intercalation, conversion, or a combination. Cathode active materials are typically provided on, or in electrical communication with, an electrically conductive cathode current collector.

Current Separator

The current separator allows ions to flow between the anode and cathode but prevents direct electrical contact. Such separators are typically porous sheets. Non-aqueous lithium-ion separators are single-layer or multi-layer polymer sheets, typically made of polyolefins, especially for small batteries. Most commonly, these are based on polyethylene or polypropylene, but polyethylene terephthalate (PET) and polyvinylidene fluoride (PVdF) can also be used. For example, a separator can have >30% porosity, low ionic resistivity, a thickness of ~10 to 50 μm and high bulk puncture strengths. Separators may alternatively include glass materials, ceramic materials, a ceramic material embedded in a polymer, a polymer coated with a ceramic, or some other composite or multilayer structure, e.g., to provide higher mechanical and thermal stability.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio, of a cyclic carbonate to a linear ester is in a range of 1:9 to 10:1, alternatively 2:8 to 7:3.

A salt for liquid electrolytes may include one or more of the following non-limiting examples: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7$)$_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), LiFSI (lithium bis(fluorosulfonyl)imide), LiTDI (lithium 4,5-dicyano-2-(trifluoromethyl)imidazole), and combinations thereof.

In some embodiments, the total concentration of a lithium salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M. In some embodiments, the electrolyte may include a saturated solution of a lithium salt and excess solid lithium salt.

In some embodiments, the battery electrolyte includes a non-aqueous ionic liquid and a lithium salt. Additives may be included in the electrolyte to serve various functions such as to stabilize the battery. For example, additives such as polymerizable compounds having an unsaturated double bond may be added to stabilize or modify the SEI. Certain amines or borate compounds may act as cathode protection agents. Lewis acids can be added to stabilize fluorine-containing anion such as $PF_6$. Safety protection agents include those to protect overcharge, e.g., anisoles, or act as fire retardants, e.g., alkyl phosphates.

A solid electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylenepropylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of an organic solvent such as those listed above. The polymer electrolyte may be an ionic liquid polymer. Such polymer-based electrolytes can be coated using any number of conventional methods such as curtain coating, slot coating, spin coating, inkjet coating, spray coating or other suitable method.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode. In some embodiments, the lithium storage layer of the cycled anode may no longer appear as a continuous layer, and instead, appear as separated pillars or islands, generally with a height-to-width aspect ratio of less than 2. While not being bound by theory, in the case of amorphous silicon, it may be that small amounts delaminate upon cycling at high stress areas. Alternatively, or in addition, it may be that structural changes upon lithiation and delithiation are non-symmetrical resulting in such islands or pillars.

In some embodiments, electrochemical cycling conditions may be set to utilize only a portion of the theoretical charge/discharge capacity of silicon (3600 mAh/g). In some embodiments, electrochemical charging/discharging cycles may be set to utilize 400-600 mAh/g, alternatively 600-800 mAh/g, alternatively 800-1000 mAh/g, alternatively 1000-1200 mAh/g, alternatively 1200-1400 mAh/g, alternatively 1400-1600 mAh/g, alternatively 1600-1800 mAh/g, alternatively 1800-2000 mAh/g, alternatively 2000-2200 mAh/g, alternatively 2200-2400 mAh/g, alternatively 2400-2600 mAh/g, alternatively 2600-2800 mAh/g, alternatively 2800-3000 mAh/g, alternatively 3000-3200 mAh/g, alternatively 3200-3400 mAh/g, or any combination of ranges thereof.

In some embodiments, current collectors of the present disclosure may be used with PECVD deposition methods that may deposit a lithium storage layer having at least 40 atomic % silicon, germanium, or a combination thereof, wherein such lithium storage layer may be characterized as other than a continuous porous lithium storage layer. In some embodiments, the lithium storage layer of the present disclosure may include adjacent columns of silicon, nanoparticle aggregates, or nanostructures.

EXAMPLES

An Oxford Plasmalabs System 100 PECVD tool was used to deposit silicon onto various current collectors. Depositions were conducted at about 300° C. at an RF power in a range of about 225 to 300 W. The deposition gas was a mixture of silane and argon in a gas flow ratio of about 1 to 12, respectively. A deposition time of 40 minutes was used to deposit a layer of porous amorphous silicon about 7 μm thick.

Copper Foil A (high purity copper) was used as the starting foil to prepare current collectors. Copper Foil A was 25 μm thick and had a surface roughness Ra of 167 nm Electrodepositions on metal foil were performed using a plating fixture such that just one side of the metal foil was exposed for the electrodeposition. The counter electrode was platinum/niobium mesh spaced 1.9 cm from the metal foil.

Comparative Examples

The authors have previously found that the above PECVD conditions are ineffective at depositing commercially useful loading of silicon onto freshly cleaned copper or nickel foil surfaces not having a surface layer. The silicon does not adhere and flakes off.

Comparative Anode C-1

In this test, it is shown electrodepositing copper nodules alone is generally not sufficient to improve adhesion of silicon. Copper Foil A was cleaned first in acetone then in IPA with sonication for 10 minutes then rinsed with DI water. The foil was treated with 10% concentrated sulfuric acid for 30 seconds, rinsed in DI water, and placed in an electrodeposition fixture. The fixture was immersed in a bath of 0.01M $CuSO_4$ (aq) with 1M $H_2SO_4$. Current was supplied to the foil at 100 mA/cm² for 100 sec (conditions suitable to deposit nodular copper), the foil was removed and rinsed in DI water and air dried. The surface roughness $R_a$ was 246 nm and surface roughness $R_z$ was 2.3 μm. When silicon was deposited by PECVD as described above, it easily flaked off.

Working Examples

Example Anode EA-1

Copper Foil A was cleaned first in acetone then in IPA with sonication for 10 minutes then rinsed with DI water. The foil was treated with 10% concentrated sulfuric acid for 30 seconds, rinsed in DI water, and placed in an electrodeposition fixture. The fixture was immersed in a bath of 0.001M $CuSO_4$ (aq) with 1M $H_2SO_4$. Current was supplied to the foil at 10 mA/cm² for 100 sec (conditions suitable to deposit nodular copper). The fixture is then placed into a bath of 0.4M $CuSO_4$ (aq) and 1M $H_2SO_4$ and supplied with a current density of 10 mA/cm² for a period of 100 seconds. This second copper deposition overcoated the nodular copper and may help anchor it to the foil. The fixture was then removed rinsed with DI water. Following the rinse, the fixture was placed into an aqueous bath including 0.5M $MnSO_4$ and supplied with a current density of 10 mA/cm2 for 500 seconds. After this the fixture was again rinsed with DI water. The fixture was then placed into a bath of 4 g/L of $K_2CrO_4$ (pH~12) and supplied with a current density of 10 mA/cm² for 40 seconds. After this the fixture again rinsed with DI water and air dried. The current collector had a surface roughness $R_z$ of 3.8 μm. An adherent layer of amorphous silicon (a continuous porous lithium storage layer) was deposited by PECVD under conditions noted above for a period of 40 minutes. The surface layers of this example may be characterized as including a first surface layer of manganese and a second surface layer of a transition metallate (chromate), such surface layers provided over a metal foil roughened with nodular copper.

Example Anode EA-2

Example Anode EA-2 used a different aqueous bath (0.3M $MnSO_4$ and 0.3M $SnSO_4$) than Example Anode EA-1. Copper Foil A was cleaned first in acetone then in IPA with sonication for 10 minutes then rinsed with DI water. The foil was treated with 10% concentrated sulfuric acid for 30 seconds, rinsed in DI water, and placed in an electrodeposition fixture. The fixture was immersed in a bath of 0.001M $CuSO_4$ (aq) with 1M $H_2SO_4$. Current was supplied to the foil at 100 mA/cm² for 100 sec (conditions suitable to deposit nodular copper). The fixture is then placed into a bath of 0.4M $CuSO_4$ (aq) and 1M $H_2SO_4$ and supplied with a current density of 10 mA/cm² for a period of 100 seconds. This second copper deposition overcoated the nodular copper and may help anchor it to the foil. The fixture was then removed rinsed with DI water. Following the rinse, the fixture was placed into an aqueous bath including 0.3M $MnSO_4$ and 0.3M $SnSO_4$ and supplied with a current density of 10 mA/cm2 for 400 seconds. After this the fixture was again rinsed with DI water. The fixture was then placed into a bath of 4 g/L of $K_2CrO_4$ (pH~12) and supplied with a current density of 10 mA/cm² for 40 seconds. After this the fixture again rinsed with DI water and air dried. The current collector had a surface roughness $R_z$ of 4.2 μm. An adherent layer of amorphous silicon (a continuous porous lithium storage layer) was deposited by PECVD under conditions noted above for a period of 40 minutes. The surface layers of this example may be characterized as including a first surface layer of a manganese-tin alloy and a second surface layer of a transition metallate (chromate), such surface layers provided over a metal foil roughened with nodular copper.

Example Anode EA-3

Example Anode EA-3 used a different aqueous bath (0.25M $MnSO_4$ and 0.25M $ZnSO_4$) than Example Anodes EA-1 and EA-2. Copper Foil A was cleaned first in acetone then in IPA with sonication for 10 minutes then rinsed with DI water. The foil was treated with 10% concentrated sulfuric acid for 30 seconds, rinsed in DI water, and placed in an electrodeposition fixture. The fixture was immersed in a bath of 0.01M $CuSO_4$ (aq) with 1M $H_2SO_4$. Current was supplied to the foil at 100 mA/cm² for 20 sec (conditions suitable to deposit nodular copper). The fixture is then placed into a bath of 0.4M $CuSO_4$ (aq) and 1M $H_2SO_4$ and supplied with a current density of 10 mA/cm² for a period of 100 seconds. This second copper deposition overcoated the nodular copper and may help anchor it to the foil. The fixture was then removed rinsed with DI water. Following the rinse, the fixture was placed into an aqueous bath including 0.25M $MnSO_4$ and 0.25M $ZnSO_4$ and supplied with a current density of 10 mA/cm2 for 100 seconds. After this the fixture was again rinsed with DI water. The fixture was then placed into a bath of 4 g/L of $K_2CrO_4$ (pH~12) and supplied with a current density of 10 mA/cm² for 40 seconds. After this the fixture again rinsed with DI water and air dried. The current collector had a surface roughness $R_z$ of 2.6 μm. An adherent layer of amorphous silicon (a continuous porous lithium storage layer) was deposited by PECVD under conditions noted above for a period of 40 minutes. The surface layers of this example may be characterized as including a first surface layer of a manganese-zinc alloy and a second surface layer of a transition metallate (chromate), such surface layers provided over a metal foil roughened with nodular copper.

Electrochemical Testing—Half Cells

Half cells were constructed using a 0.80 cm diameter punch of each anode. Lithium metal served as the counter electrode which was separated from the test anode using Celgard™ separators. Example Anodes EA-1 and EA-2 used a standard electrolyte solution which included: a) 88 wt. % of 1.2 M $LiPF_6$ in 3:7 EC:EMC (weight ratio); b) 10 wt. % FEC; and 2 wt. % VC. Example Anode EA-3 used a commercial electrolyte very similar to the standard, but with one or more additives (proprietary to the supplier). The additives are not expected to impact the electrochemical testing results of Example Anode EA-3. Anodes first underwent an electrochemical formation step. As is known in the art, the electrochemical formation step is used to form an initial SEI layer. Relatively gentle conditions of low current and/or limited voltages may be used to ensure that the anode is not overly stressed. In the present examples, electrochemical formation included several cycles over a wide voltage range (0.01 or 0.06 to 1.2V) at C-rates ranging from C/20 to C/10. The total active silicon ($mg/cm^2$) available for reversible lithiation and total charge capacity ($mAh/cm^2$) were determined from the electrochemical formation step data. Formation losses were calculated by dividing the change in active areal charge capacity (initial first charge capacity minus last formation discharge capacity) by the initial areal first charge capacity. While silicon has a theoretical charge capacity of about 3600 mAh/g when used in lithium-ion batteries, it has been found that cycle life may improve if only a portion of the full capacity is used. For all anodes, the performance cycling was set to use a portion of the total capacity, typically in a range of 950-1700 mAh/g. The performance cycling protocol included 1C charging (considered aggressive in the industry) and C/3 discharging to roughly a 15% state of charge. A 10-minute rest was provided between charging and discharging cycles.

Table 2 summarizes the properties and cycling performance the Example Anodes. For certain practical applications, anodes should have a charge capacity of at least 1.5 $mAh/cm^2$ and a cycle life of at least 100 cycles, meaning that the charge capacity should not fall lower than 80% of the initial discharge capacity ("80% SOH") after 100 cycles. Example Anodes EA-2 and EA-3 both met these criteria (191 and 119 cycles, respectively). Example Anode EA-1 had a cycle life of 50 cycles, which is still useful for certain applications. In some embodiments, for example, embodiments using a transition oxometallate surface sublayer, an underlying surface sublayer using a manganese alloy may perform better than one using manganese alone. It is noted also that the formation losses were all relatively low. It has often been observed that high formation losses may be indicative of an unstable anode. In general, formation losses of less than 15% are considered very good.

TABLE 2

| Sample | Charge Rate | Capacity ($mAh/cm^2$) | Formation loss (%) | Cycles to 80% SOH |
|---|---|---|---|---|
| EA-1 | 1 C | 1.7 | 14% | 50 |
| EA-2 | 1 C | 1.7 | 14% | 191 |
| EA-3 | 1 C | 1.7 | 10% | 119 |

Although the present anodes have been discussed with reference to batteries, in some embodiments the present anodes may be used in hybrid lithium-ion capacitor devices.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. The invention has now been described in detail for the purposes of clarity and understanding. However, it will be appreciated that certain changes and modifications may be practice within the scope of the appended claims.

All publications, patents, and patent applications cited herein are hereby incorporated by reference in their entirety for all purposes. None is admitted to be prior art.

We claim:

1. An anode for an energy storage device, the anode comprising:
   a) a current collector comprising an electrically conductive layer and a surface layer overlaying the electrically conductive layer; and
   b) a lithium storage layer overlaying the surface layer, wherein:

i) the surface layer comprises a first surface sublayer comprising manganese,
ii) the surface layer comprises a second surface sublayer comprising a transition oxometallate or a metal oxide, wherein the transition oxometallate or the metal oxide comprises a metal other than manganese, wherein the second surface sublayer is in contact with the first surface sublayer, and
iii) the lithium storage layer comprises at least 40 atomic % silicon, germanium, or a combination thereof.

2. The anode of claim 1, wherein the second surface sublayer interposed between the first surface sublayer and the lithium storage layer.

3. The anode of claim 1, wherein the second surface sublayer comprises a transition oxometallate comprising titanium, chromium, vanadium, iron, cobalt, nickel, molybdenum, tungsten, zirconium, or niobium.

4. The anode of claim 1, wherein the second surface sublayer comprises a metal oxide comprising titanium, vanadium, chromium, iron, cobalt, nickel, copper, zinc, molybdenum, tungsten, silver, zirconium, hafnium, tin, aluminum, indium, or niobium.

5. The anode of claim 1, wherein at least a portion of the first surface sublayer comprises zero valent or divalent manganese.

6. The anode of claim 5, wherein the first surface sublayer comprises a mixture or an alloy of manganese and another metal.

7. The anode of claim 5, wherein the first surface sublayer further comprises tin.

8. The anode of claim 5, wherein the first surface sublayer further comprises zinc.

9. The anode of claim 5, wherein the first surface sublayer further comprises a transition metal.

10. The anode of claim 1, wherein the surface layer has an average thickness in a range of 0.5 nm to 2000 nm.

11. The anode of claim 1, wherein the current collector is characterized by a surface roughness of $R_z \geq 2.5$ µm.

12. The anode of claim 1, wherein the electrically conductive layer comprises copper.

13. The anode of claim 1, wherein the electrically conductive layer is characterized by a tensile strength of at least 500 MPa.

14. The anode of claim 1, wherein the lithium storage layer is a continuous porous lithium storage layer.

15. The anode of claim 14, wherein the lithium storage layer comprises at least 80 atomic % of amorphous silicon.

16. The anode of claim 15, wherein the density of the lithium storage layer is in a range of 1.1 to 2.29 g/cm$^3$.

17. The anode of claim 14, wherein the lithium storage layer has an average thickness of at least 7 µm.

18. The anode of claim 1, wherein the lithium storage layer includes less than 10 atomic % carbon and is substantially free of high aspect ratio nanostructures.

19. The anode of claim 1, wherein the electrically conductive layer comprises nickel.

20. The anode of claim 1, wherein the second surface sublayer comprises chromate.

* * * * *